(12) United States Patent
Yang

(10) Patent No.: US 6,964,311 B2
(45) Date of Patent: Nov. 15, 2005

(54) REPULSIVE DIFFERENTIAL DRIVING DOUBLE-ACTING TYPE ELECTRICAL MACHINERY POWER SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 120 days.

(21) Appl. No.: 10/407,131

(22) Filed: Apr. 7, 2003

(65) Prior Publication Data

US 2004/0195015 A1 Oct. 7, 2004

(51) Int. Cl.[7] .............................................. B60K 41/00
(52) U.S. Cl. ...................................... 180/65.1; 475/220
(58) Field of Search .............................. 180/65.1, 65.5, 180/65.6, 248; 475/220, 225; 477/3, 5

(56) References Cited

U.S. PATENT DOCUMENTS

| | | | | |
|---|---|---|---|---|
| 4,270,622 A | * | 6/1981 | Travis ........................ | 180/65.4 |
| 5,224,563 A | * | 7/1993 | Iizuka et al. ................ | 180/65.3 |
| 5,941,790 A | * | 8/1999 | Steen et al. .................. | 475/230 |
| 5,947,855 A | * | 9/1999 | Weiss ............................ | 475/5 |
| 6,116,704 A | * | 9/2000 | Nakakita et al. ............ | 303/152 |
| 6,148,940 A | * | 11/2000 | Hokanson et al. ......... | 180/65.5 |
| 6,398,685 B1 | * | 6/2002 | Wachauer et al. .......... | 475/149 |
| 6,629,026 B1 | * | 9/2003 | Baraszu et al. ................ | 701/22 |
| 6,661,109 B2 | * | 12/2003 | Fukasaku et al. ......... | 290/40 C |
| 2004/0079568 A1 | * | 4/2004 | Bell et al. ................... | 180/65.6 |
| 2004/0089485 A1 | * | 5/2004 | Kramer et al. ............. | 180/65.1 |

FOREIGN PATENT DOCUMENTS

| | | | | | |
|---|---|---|---|---|---|
| JP | 5116541 | * | 5/1993 | ............ | B60K/1/02 |
| JP | 5-116542 | * | 5/1993 | ............ | B60K/1/02 |
| JP | 5-169991 | * | 7/1993 | ............ | B60K/1/02 |

* cited by examiner

Primary Examiner—J. Allen Shriver
(74) Attorney, Agent, or Firm—Rabin & Berdo, P.C.

(57) ABSTRACT

The invention comprises twin double-acting electrical machinery assembly, each being of interactive rotational type, and such that the interactive rotational assembly on the non-outputting side of either double-acting electrical machinery assembly gets coupled to its counterpart interactively by slidably applied damping effect or alternatively by solid coupling technology.

3 Claims, 5 Drawing Sheets

REPULSIVE DIFFERENTIAL DRIVING DOUBLE-ACTING TYPE ELECTRICAL MACHINERY POWER SYSTEM

BACKGROUND OF THE INVENTION (a) Field of the Invention

The invention comprises twin double-acting electrical machinery assembly, each being of interactive rotational type, and such that the interactive rotational assembly on the non-outputting side of either double-acting electrical machinery assembly gets coupled to its counterpart interactively by slidably applied damping effect or alternatively by solid coupling technology.

(b) Description of the Prior Art

The conventional single motor driven electric carrier usually relies on the differential driving device to drive the two side loading wheel to move forward or backward or differential driven turning operations in the same rotational directions, wherein their disadvantages include the high cost of the additionally installed differential transmission device, large weight, and the existence of normal transmission loss.

SUMMARY OF THE INVENTION

The invention comprises twin double-acting electrical machinery assembly, each being of interactive rotational type, and such that the interactive rotational assembly on the non-outputting side of either double-acting electrical machinery assembly gets coupled to its counterpart interactively by slidably applied damping effect or alternatively by solid coupling technology.

DETAILED DESCRIPTION OF THE INVENTION

According to the invention, the repulsive differential driving double-acting type electrical machinery power system is comprised of twin double-acting type electrical machinery assembly each having a first interactive rotational electrical machinery assembly structure and a second interactive rotational electrical machinery assembly structure, and the double-acting type electrical machinery assembly is constituted by the AC or DC, brush-less or brushed, synchronous or asynchronous, cylindrical shaped or disk shaped cup shaped electrical machinery assembly, whereof its constituting methods includes: one interactive rotational electrical machinery assembly structure is coupled with the load while the other interactive rotational electrical machinery assembly structure is coupled with a differential unit to allow each aforesaid double-acting type electrical machinery assembly appear in back to back coupling with the differential device in any axial directions, and in case that any interactive rotational electrical machinery assembly structure undertakes a larger damping to cause rotational speed difference, such as for the case that when the vehicle is driving in a snaky road whereby to cause the two side wheels operated in different rotation speeds, due to the double-acting operating characteristics of the double-acting type electrical machinery assembly, the interactive rotational electrical machinery assembly structure coupled with the differential device is then imposed by a repulsive acting force, thereby the rotational speed difference can be adjusted by the differential device, therefore the repulsive differential driving double-acting type electrical machinery power system is characterized to drive the two side wheels moving forward, backward and differential driven turning operation in the same rotational directions.

Figure 1:
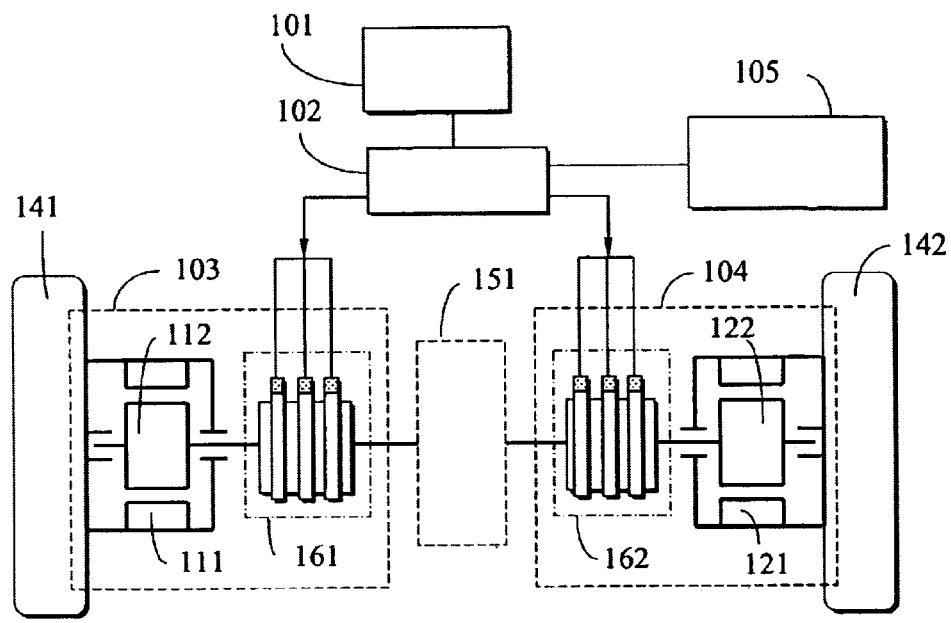
FIG. 1 is a block schematic diagram of the invention illustrating a power system constituted by twin double-acting type electrical machinery assembly.

The repulsive differential driving double-acting type electrical machinery power system is described in the following by taking the embodiment of a equal speed driving in the same direction or repulsive differential driving power system constituted by the twin double-acting type electrical machinery assembly constitute for snaky road driving:

FIG. 1 is a block schematic diagram of the invention illustrating a power system constituted by twin double-acting type electrical machinery, wherein it is mainly characterized in the following:

An operating instructions input device 101: It is comprised of electromechanical or solid state electronic circuit components for generating the analog or digital operating signals to control the driving control device 102, and through the driving control device 102 to further control the twin double-acting type electrical machinery assembly 103, 104 for part or all of the following functions: positive or reverse rotations, speed changes, motor function, generator function, regeneration braking functioning operation, input/output current limitations, electromagnetic effect locking functions;

A power supply and storing device 105: It is constituted by the municipal power system, or the engine driven generator units, or the batteries set or the flywheel type accumulated power generation device for supplying power through the driving control device 102 to drive the double-acting type electrical machinery assembly for motor function operation and for absorbing or storing power from the double-acting type electrical machinery assembly when it is employed for generation function operation;

A driving control device 102: It is constituted by the electromechanical or solid state electronic power components for receiving the commands from the operating instructions input device 101 and through the driving control device 102 to further control the twin double-acting type electrical machinery assembly 103, 104 for part or all of the following functions: positive or reverse rotations, speed changes, motor function, generator function, regeneration braking functioning operation, input/output current limitations, electromagnetic effect locking functions; thereof the double-acting type electrical machinery assembly driving device can be by a common driving control device 102 to drive the multiple double-acting type electrical machinery assembly simultaneously, or by the individual driving control device to drive the individual double-acting type electrical machinery assembly according to system requirements, thereof if the double-acting type electrical machinery assembly is of the DC brushed electrical machinery, then the driving control device 102 is constituted by the electromechanical or solid state electronic power components to be the motor or generator functions operation control circuit device or the polarity switch direction control device by providing the analog modulating control or chopped wave modulating control on the armature, or the field magnetic intensity modulating control, or mixture of both; thereof if the double-acting type electrical machinery assembly is of the synchronous or asynchronous brushless electrical machinery, or slip ring type synchronous or asynchronous electrical machinery, then the driving circuit of the inverter type driving control device constituted by the electromechanical or solid state components is employed to control the double-acting type electrical machinery assembly for motor or generator function operations;

The twin double-acting type electrical machinery assembly 103, 104: It is constituted by the AC or DC, brush-less or brushed, synchronous or asynchronous, cylindrical shaped or disk shaped cup shaped electrical machinery, whereof the twin double-acting type electrical machinery assembly is each individually composed of the first reciprocating rotational electrical machinery assembly structures 111, 121 for motor function or generator function interactive operations and the second interactive rotational electrical machinery assembly structures 112, 122, and the rotational conducting ring brushes 161, 162 for power input or output as well as the related components of the rotating shaft, bearing, and cooling devices etc., wherein the first interactive rotational electrical machinery assembly structures 111, 121 of the individual double-acting type electrical machinery assembly are respectively coupled with the loads 141, 142 while the second interactive rotational electrical machinery assembly structures 112, 122 operated in corresponding to the first interactive rotational electrical machinery assembly structures are respectively coupled with the differential acting device 151, whereby the interactive relationships between the twin double-acting type electrical machinery assembly 103, 104 and the differential acting device 151 constitute the operation of the repulsive differential driving power system;

The Loads 141, 142: They are the driving wheels or track driving wheel of carriers such as vehicles or other loads which are respectively installed at the two sides of vehicles for driving the carrier to move forward or backward or differential driven turning operations in the same directions, or for positive or reverse rotational and differential driving outputs in different rotating directions;

The rotation differences of the repulsive differential driving power system constituted by the aforesaid double-acting type electrical machinery assembly 103, 104 and the differential device 151 can be adjusted through the differential device 151 in the case of different rotations output of the twin double-acting type electrical machinery assembly under loading variations.

Figure 2:
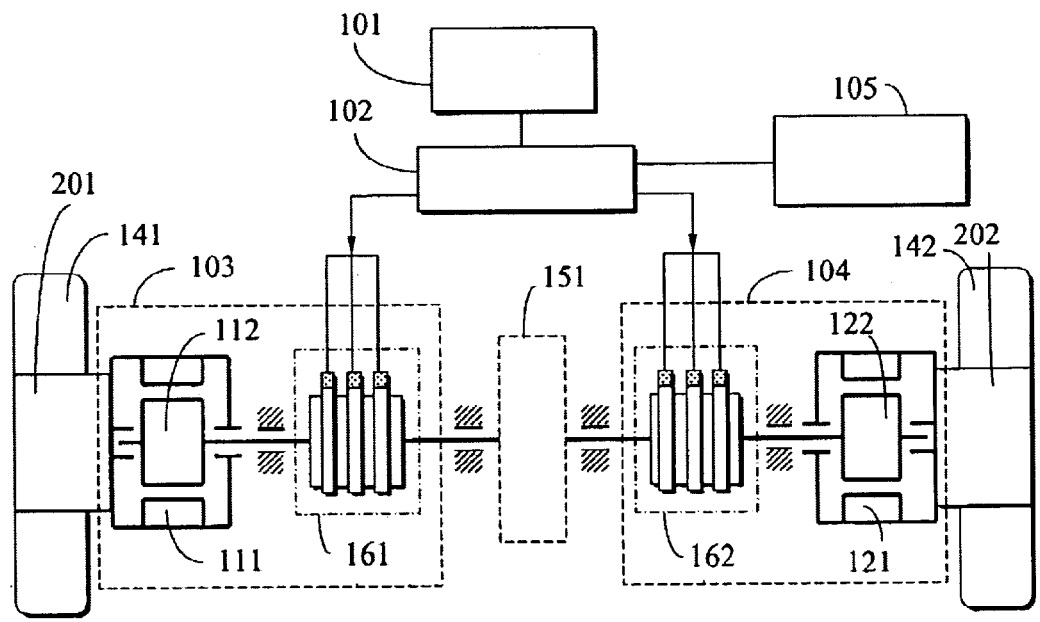
FIG. 2 is an preferred embodiment of the invention illustrating a speed reducer device is installed between the double-acting type electrical machinery assembly output shaft and the load.

Besides, due to the different requirements for the various load operating conditions and rotational speed ranges, the speed reducer devices 201, 202 can be installed as required between the output shafts of the twin double-acting type electrical machinery assembly embodied accordingly 103, 104 and the loads 141, 142; wherein FIG. 2 is a preferred embodiment of the invention illustrating a speed reducer device is installed between the double-acting type electrical machinery assembly output shaft and the load.

Figure 3:
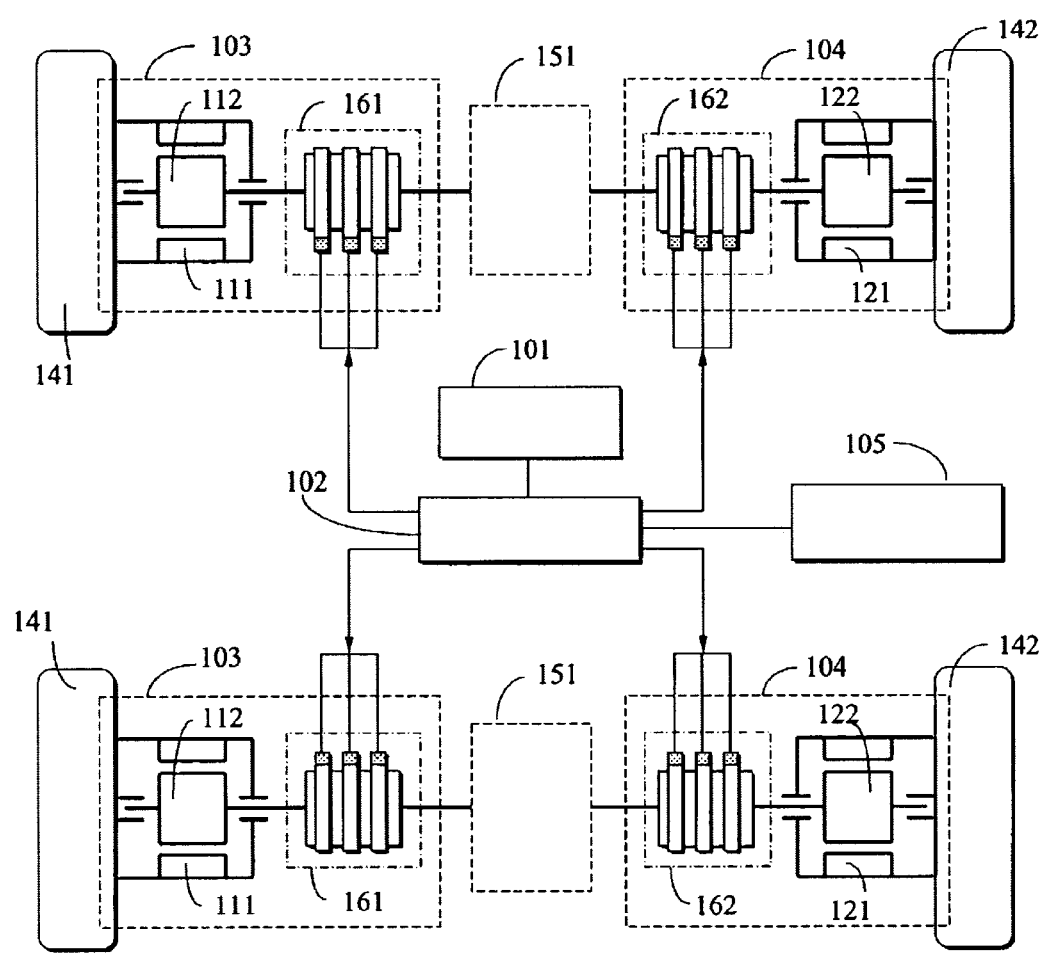
FIG. 3 is an embodiment applied of the invention illustrating the parallel combined operation by two power systems.

Besides of that the repulsive differential driving double-acting type electrical machinery power system can be constituted by twin double-acting type electrical machinery assembly into a power system, it can be further constituted by the parallel combination of two or more than two systems, wherein FIG. 3 is an embodiment applied of the repulsive differential driving double-acting type electrical machinery power system illustrating the parallel combined operation by two power systems, whereof each system is respectively comprised of the twin double-acting type electrical machinery assembly 103, 104 combining with a differential device 151 to constitute a repulsive differential driving power system, thereby the two repulsive differential driving power system is driven by the driving control device 102; wherein it is mainly comprised of the following:

An operating instructions input device 101: It is comprised of electromechanical or solid state electronic circuit components for generating the analog or digital operating signals to control the driving control device 102, and through the driving control device 102 to further control the double-acting type electrical machinery assembly 103, 104 for part or all of the following functions: positive or reverse rotations, speed changes, motor function, generator function, regeneration braking functioning operation, input/output current limitations, electromagnetic effect locking functions;

A power supply and storing device 105: It is constituted by the municipal power system, or the engine driven generator units, or the batteries set or the flywheel type accumulated power generation device for supplying power through the driving control device 102 to drive the double-acting type electrical machinery assembly for motor function operation and for absorbing or storing power from the double-acting type electrical machinery assembly when it is employed for generation function operation;

A driving control device 102: It is constituted by the electromechanical or solid state electronic power components for receiving the commands from the operating instructions input device 101 and through the driving control device 102 to further control the double-acting type electrical machinery assembly 103, 104 for part or all of the following functions: positive or reverse rotations, speed changes, motor function, generator function, regeneration braking functioning operation, input/output current limitations, electromagnetic effect locking functions; thereof the double-acting type electrical machinery assembly driving device can be by a common driving control device 102 to drive the multiple double-acting type electrical machinery assembly simultaneously, or by the individual driving control device to drive the individual double-acting type electrical machinery assembly according to system requirements, thereof if the double-acting type electrical machinery assembly is of the DC brushed electrical machinery, then the driving control device 102 is constituted by the electromechanical or solid state electronic power components to be the motor or generator functions operation control circuit device or the polarity switch direction control device by providing the analog modulating control or chopped wave modulating control on the armature, or the field magnetic intensity modulating control, or mixture of both; thereof if the double-acting type electrical machinery assembly type is of the synchronous or asynchronous brushless electrical machinery, or slip ring type synchronous or asynchronous electrical machinery, then the driving circuit of the inverter type driving control device constituted by the electromechanical or solid state components is employed to control the double-acting type electrical machinery assembly for motor or generator function operations;

The twin double-acting type electrical machinery assembly 103, 104: they are for constituting the first repulsive differential driving power system and the second repulsive differential driving power system, whereof the double-acting type electrical machinery assembly includes the AC or DC, brush-less or brushed, synchronous or asynchronous, cylindrical shaped or disk shaped cup shaped electrical machinery, whereof the individual double-acting type electrical machinery assembly is mainly comprised of the first interactive rotational electrical machinery assembly structures 111, 121 for motor function or generator function interactive operations and the second interactive rotational electrical machinery assembly structures 112, 122, and the rotational conducting ring brushes 161, 162 for power input or output as well as the related components of the rotating shaft, bearing, and cooling devices etc., wherein the first interactive rotational electrical machinery assembly structures 111, 121 of the individual double-acting type electrical machinery assembly are respectively coupled with the loads 141, 142 while the second interactive rotational electrical machinery assembly structures 112, 122 operated in corresponding to the first interactive rotational electrical machinery assembly structures are respectively coupled with the differential acting device 151, whereby the twin double-acting type electrical machinery assembly 103, 104 and the differential acting device 151 constitute the repulsive differential driving power system;

The Loads 141, 142: They are the driving wheels or track driving wheel of carriers such as vehicles or other loads which are respectively installed at the two sides of vehicles for driving the carrier to move forward or backward or differential driven turning operations in the same directions, or for positive or reverse rotational and differential driving outputs in different rotating directions;

The aforesaid differential device 151 coupled with the double-acting type electrical machinery assembly can be selected as required to be constituted by differential gears, or can be further installed with damping device at the differential acting side of the differential gear as in conventional vehicles, thereby to improve the disadvantage of loosing both side torque outputs simultaneously in case of single side load slip off; or to adopt the embodiment that the load is directly driven by the first interactive rotational electrical machinery assembly structures 111, 121 of the twin double-acting type electrical machinery assembly 103, 104, while the second interactive rotational electrical machinery assembly structures 112, 122 are coupled with damping devices.

Figure 4:
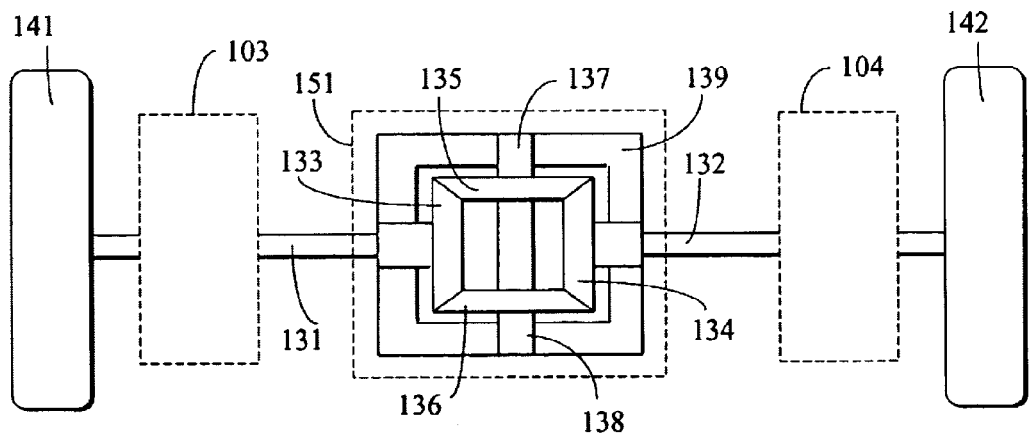
FIG. 4 is an preferred embodiment of the invention illustrating that the differential device is comprised of differential gears to constitute the power system.

FIG. 4 is an preferred embodiment of the differential device comprised of differential gears, wherein the gears 133, 134, 135, 136 are mutually coupled to constitute a differential wheel train, whereof the rotation shaft 131 of gear 133 and the gear 134 along with its rotation shaft 132 are respectively coupled with the individual double-acting type electrical machinery assembly 103, 104, while the rotation shaft 137 of the gear 135 and the rotation shaft 138 of the gear 136 are commonly driving the differential ring frame 139 for differential rotations.

Figure 5:
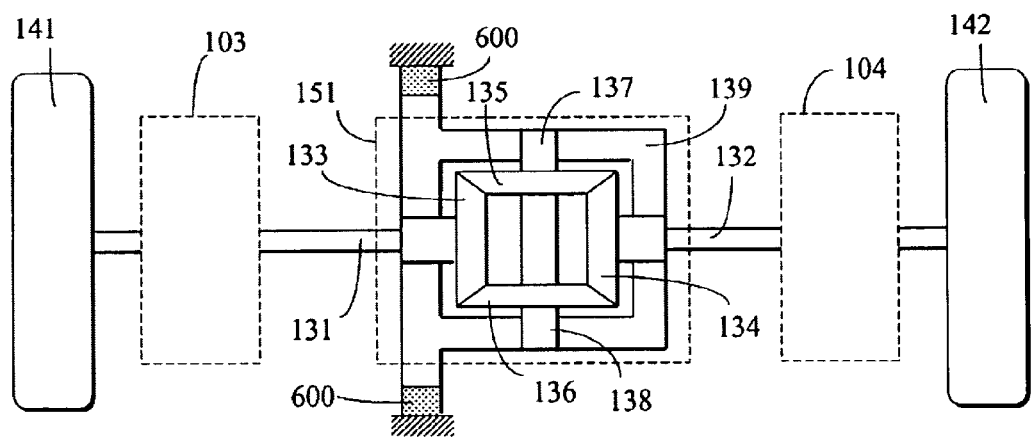
FIG. 5 is an preferred embodiment illustrating that the differential acting side ring frame in the preferred embodiment of FIG. 4 is further installed with damping devices.

FIG. 5 is an preffered embodiment illustrating that the differential acting side ring frame in the preferred embodiment of FIG. 4 is further installed with damping devices. The damping device 600 in FIG. 5 can be coupled radially or axially or cone-ward between the differential ring frame 139 and the static parts such as car body or machinism shell, etc.; whereof the damping device 600 may be one which consists of rotational damping means such as, for embodiment, fluid energy source, mechanical friction, electromagnetic generation, or else in the form of eddy current effect; or where appropriate, consists of resiliently applied rotational damping means such as: fluid energy source capable of storing and releasing energy, or mechanical spring: wherein one side of the damping device 600 is coupled with the differential ring frame 139, while the other side of the damping device DP100 is lock fixed on the static parts such as the car body or mechanism shells, etc.

Figure 6:
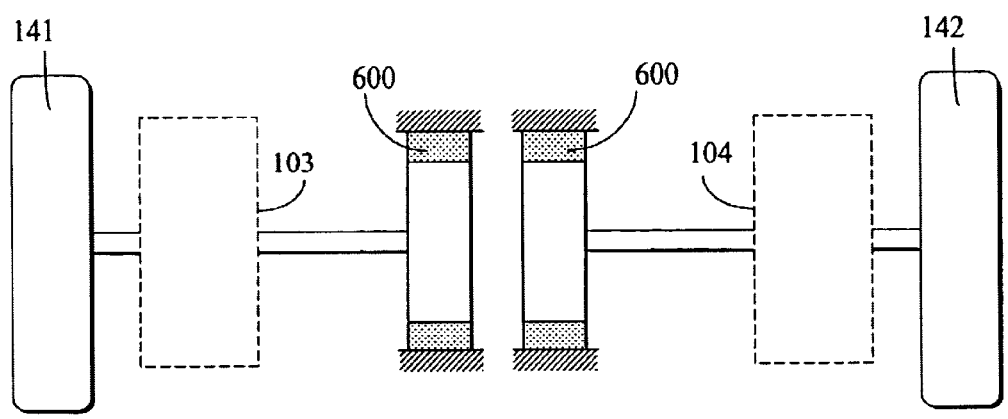
FIG. 6 is the first preferred embodiment illustrating that the two interactive rotational electrical machinery assembly structures of the twin double-acting type electrical machinery assembly are respectively coupled with damping devices.

FIG. 6 is the first preferred embodiment illustrating that the two interactive rotational electrical machinery assembly structures of the twin double-acting type electrical machinery assembly are respectively coupled with the load and the damping devices; wherein it is characterized in the embodiment of that one interactive rotational electrical machinery assembly structure of the double-acting type electrical machinery assembly is directly coupled (or through transmission device) with the load, while the other interactive rotational electrical machinery assembly structure of the electrical machinery assembly is individually coupled with one side of the corresponding operating structure of the damping device 600, while the other side of the damping device 600 is lock fixed on the static part such as the car body or mechanism shells, etc., whereof the damping device 600 may be one which consists of rotational damping means such as, for example, fluid energy source, emchanical friction, electromagnetic generation, or else in the form of eddy current effect; or where appropriate, consists of resiliently applied rotational damping means such as: fluid energy source capable of storing and releasing energy, or mechanical spring.

Figure 7:
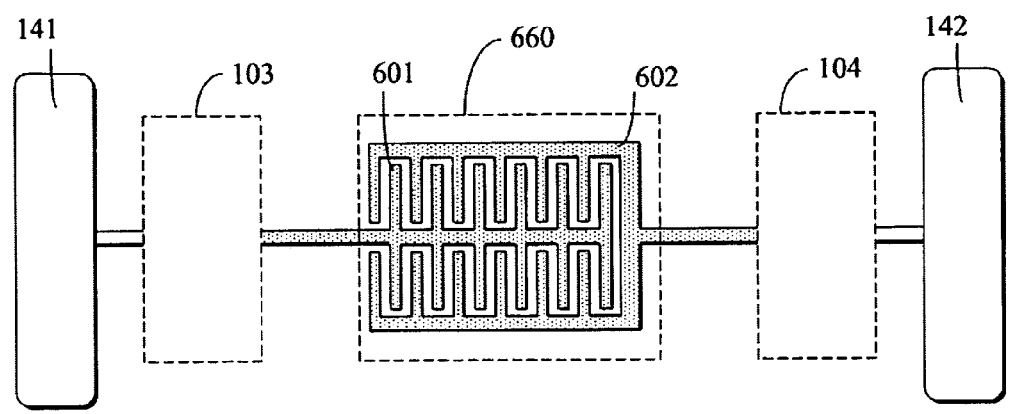
FIG. 7 is the second preferred embodiment illustrating that the two interactive rotational electrical machinery assembly structures of the twin double-acting type electrical assembly are respectively coupled with damping devices.

FIG. 7 is the second preferred embodiment illustrating that the twin interactive rotational electrical machinery assembly structures of the twin double-acting type electrical machinery assembly are respectively coupled with damping devices, wherein it is characterized in that one interactive rotational electrical machinery assembly structure of the double-acting type electrical machinery assembly is directly coupled (or through transmission device) with the load, while the other interactive rotational electrical machinery assembly structure of the electrical machinery assembly is individually coupled with one side of the damping devices 601, 602, while the other sides of the damping device 601, 602 are mutually coupled, to the effect that the damping mechanism featuring differential damping effects and comprising structurally, be it of the fluid power mode, of the mechanical friction mode, of the electromagnetic generation mode, or still of the eddy current effect mode, present and intervening way between the twin interactive rotational electrical machinery assembly 601, 602, will altogether account for an overall slidable Damper 660, this Damper 660, capable of producing differentially directed loading condition to bear upon the twin double-acting type electrical machinery assembly structured accordingly, substantiates a repulsive differential double-acting electrical machinery assembly System represented hereunder by the present invention.

In case of adopting the damping devices, besides of that the repulsive differential driving double-acting type electrical machinery power system can be constituted by twin double-acting type electrical machinery assembly, it can be further constituted by twin or more than twin ouble-acting type electrical machinery assembly, wherein one interactive rotational electrical machinery assembly structure of each double-acting type electrical machinery assembly is still employed to drive the load, the corresponding other interactive rotational electrical machinery assembly structure can be back to back coupled in any axial directions with the common differential device.

In addition, for applications of the repulsive differential driving double-acting type electrical machinery power system in driving the load in the same rotational direction, the non-for load driving interactive rotational electrical machinery assembly structure of the double-acting type electrical machinery assembly can be coupled with the wheel train appearing in the interactive relationship of contrary rotational directions, whereby to accomplish the repulsive differential driving functions, or the non-for load driving interactive rotational electrical machinery assembly structure of the double-acting type electrical machinery assembly can be directly commonly coupled with the interactive wheel trains in the same rotational direction or directly mutually coupled.

Figure 8:
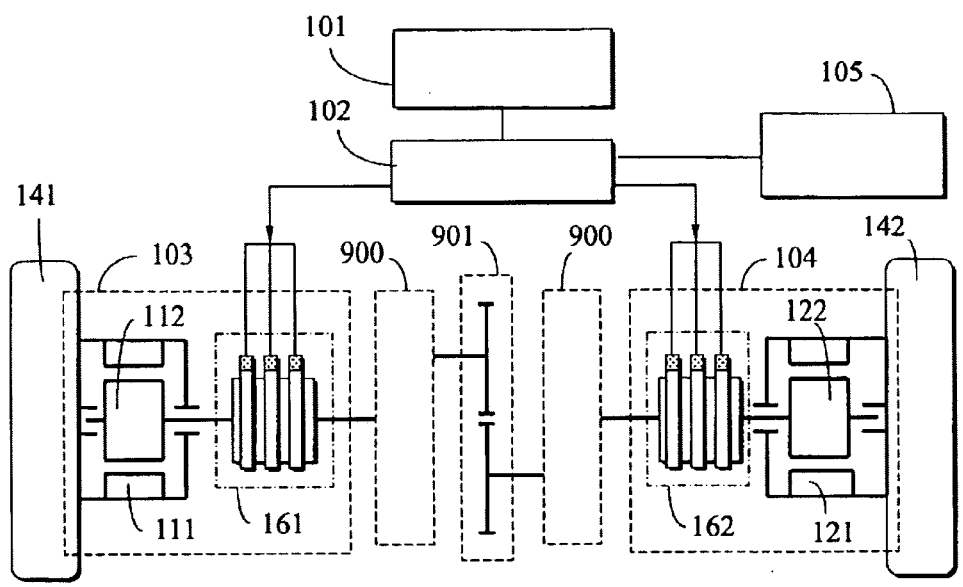
FIG. 8 is an preferred embodiment of the invention illustrating that the twin double-acting type electrical machinery assembly are coupled with the wheel train through the axial direction change transmission devices in mutual contrary rotational direction to constitute a repulsive differential driving power system.

FIG. 8 is an preferred embodiment illustrating that the twin double-acting type electrical machinery assembly are coupled with the wheel train through the axial direction change transmission devices in mutual contrary rotational direction to constitute a repulsive differential driving power system, wherein it is mainly characterized in that the individual second interactive rotational electrical machinery assembly structures 112, 122 of the twin double-acting type electrical machinery assembly 103, 104, installed back-to-tack, are respectively coupled with the two input shafts of the wheel train 901 appearing in the interactive relationship of contrary rotation directions through the axial direction change transmission device 900 constituted by the universal transmission device or equal-speed universal transmission device or bevel gears, while the first interactive rotational electrical machinery assembly structures 111, 121 of the twin double-acting type electrical machinery assembly drive the load in the same rotational direction.

Figure 9:
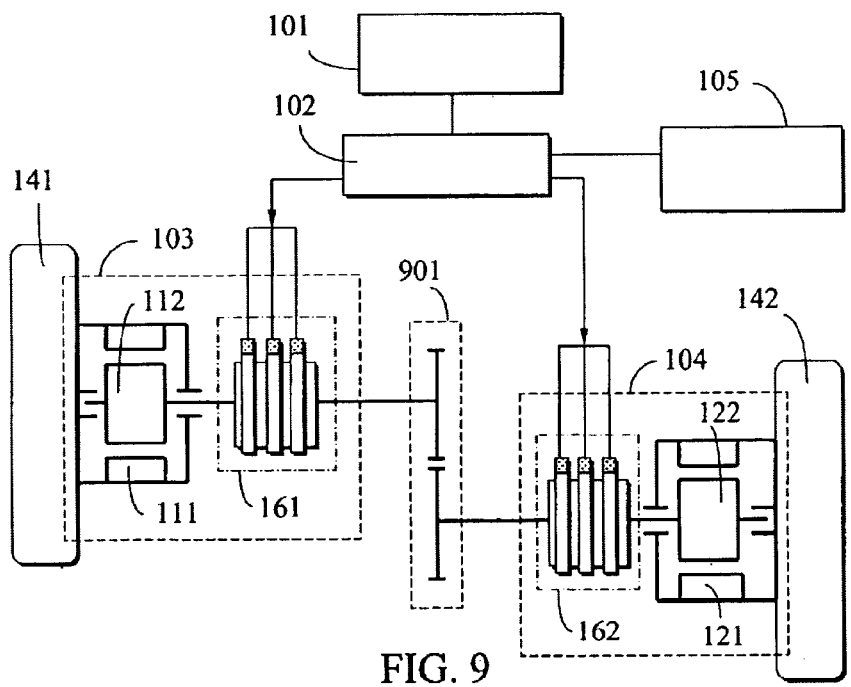
FIG. 9 is an preferred embodiment of the invention illustrating that the twin double-acting type electrical machinery assembly are respectively coupled with the wheel train in mutual contrary rotational directions to constitute a repulsive differential driving power system.

FIG. 9 is an preferred embodiment illustrating that the two back to back installed double-acting type electrical machinery assembly are respectively coupled with the wheel train in mutual contrary rotational directions thereby to constitute the repulsive differential driving power system, wherein it is mainly characterized in that the individual second interactive rotational electrical machinery assembly structures 112, 122 of the twin double-acting type electrical machinery assembly 103, 104, installed back-to-back, 103, 104 are respectively coupled with the two input shafts of the wheel train 901 appearing in the interactive relationship of contrary rotation directions, while the first interactive rotational electrical machinery assembly structures 111, 121 of the twin double-acting type electrical machinery assembly drive the load in the same rotational direction; thereof besides of that the twin double-acting type electrical machinery assembly as shown in the preferred embodiment of the FIG. 9 can be back to back installed, it can be parallel installed at the same side, thereby to combine with the interactive wheel trains in contrary rotation directions whereby to constitute the repulsive differential driving double-acting type electrical machinery power system.

As summarized from the above descriptions and by comparing the design with the conventional system of a single drive motor through a single input shaft and further through a differential wheel train to the two output shafts, it shows that the differential wheel trains of the conventional differential wheel train power systems only operate at differential output, but the input side pinion gear is always rotated with low efficiency (the efficiency of pinion gear is about 50%~80% ), thereof the system only operates at differential output, and is advantageous of no aforesaid pinion gear loss problems in normal operation.

What is claimed is:

1. A repulsive differential driving double-acting electrical machinery power system comprising:
   a twin double-acting type electrical machinery assembly further comprising a first interactive rotational electrical machinery assembly structure and a second interactive rotational electrical machinery assembly structure,
   wherein the first interactive rotational electrical machinery assembly structure is coupled with the load while the second interactive rotational electrical machinery assembly structure is coupled with a differential device to allow each double-acting electrical machinery assembly to be in back to back coupling with the differential device in axial directions,
   whereby, if one of the interactive rotational electrical machinery assembly structures undertakes a larger damping to cause a rotational speed difference, then due to the double-acting operating characteristics of the double-acting electrical machinery assembly, there is a repulsive acting force, and thereby the rotational speed difference can be adjusted by the differential device, and therefore the repulsive differential driving double-acting electrical machinery power system is adapted to drive two side wheels moving forward, and backward, and provide differential driven turning operation in same rotational directions.

2. The repulsive differential driving double-acting electrical machinery power system as in claim 1, comprising:
   an operating instructions input device comprised of electromechanical or solid state electronic circuit components for generating analog or digital operating signals to control a driving control device, and through the driving control device to further control the twin double-acting electrical machinery assembly or all of the following functions: positive or reverse rotations, speed changes, motor function, generator function, regeneration braking functioning operation, input/output current limitations, and electromagnetic effect locking functions;

a power supply and storing device including a municipal power grid, or engine driven generator units, or batteries or a flywheel accumulated power generation device for supplying power through the driving control device to drive the double-acting electrical machinery assembly for motor function operation and for absorbing or storing power from the double-acting electrical machinery assembly when it is employed for generation function operation;

a driving control device including electromechanical or solid state electronic power components for receiving commands from the operating instructions input device and through the driving control device to further control the twin double-acting electrical machinery for assembly part or all of the following functions: positive or reverse rotations, speed changes, motor function, generator function, regeneration braking functioning operation, input/output current limitations, and electromagnetic effect locking functions; whereby the double-acting electrical machinery assembly driving device is drivable by a common driving control device to drive the multiple double-acting electrical machinery assembly simultaneously, or by an individual driving control device to drive the individual double-acting electrical machinery assembly according to system requirements, whereby if the double-acting electrical machinery assembly is DC brushed electrical machinery, then the driving control device includes electromechanical or solid state electronic power components to be a motor or generator functions operation control circuit device or a polarity switch direction control device by providing an analog modulating control or chopped wave modulating control to an armature, or a field magnetic intensity modulating control, or mixture; thereof; and if the double-acting electrical machinery assembly is synchronous or asynchronous brush-less electrical machinery, or slip ring synchronous or asynchronous electrical machinery, then the driving circuit of an inverter driving control device constituted by the electromechanical or solid state components is employed to control the double-acting electrical machinery assembly for motor or generator function operations;

wherein the twin double-acting electrical machinery assembly includes AC or DC, brush-less or brushed, synchronous or asynchronous, cylindrical shaped or disk shaped cup shaped electrical machinery, wherein the first interactive rotational electrical machinery assembly structure and the second interactive rotational electrical machinery assembly structure include rotational conducting ring brushes for power input or output as well as related components including a rotating shaft, bearing, and cooling devices, wherein the first interactive rotational electrical machinery assembly structures of the individual double-acting electrical machinery assembly are respectively coupled with the loads while the second interactive rotational electrical machinery assembly structures are respectively coupled with the differential device 151, whereby the interactive relationships between the twin double-acting electrical machinery assembly and the differential device constitute operation of the repulsive differential driving power system;

wherein the loads are driving wheels or track driving wheels of vehicles, or other loads which are respectively installed at the respective two sides of the vehicles for driving the vehicles to move forward or backward or in differentially driven turning operations in the same directions, or for positive or reverse rotational and differential driving outputs in different rotating directions;

wherein rotation differences of the repulsive differential driving power system constituted by the double-acting electrical machinery assembly and the differential device are adjustable through the differential device in the case of different rotations output by the twin double-acting electrical machinery assembly under loading variations.

3. The repulsive differential driving double-acting electrical machinery power system as in claim 2, further comprising speed reducer devices installed between output shafts of the twin double-acting electrical machinery assembly and the loads.

\* \* \* \* \*